United States Patent [19]
Parfomak et al.

[11] Patent Number: 4,862,050
[45] Date of Patent: Aug. 29, 1989

[54] OPTICAL COMMUTATION AND TILT SENSING FOR A PERMANENT MAGNET GYRO

[75] Inventors: Walter Parfomak, Wallington; Jerome Sears, Wyckoff; Walter J. Kluss, Clifton, all of N.J.

[73] Assignee: Allied-Signal Inc., Morris Township, Morris County, N.J.

[21] Appl. No.: 127,723

[22] Filed: Dec. 2, 1987

[51] Int. Cl.[4] ............................................. G05B 17/00
[52] U.S. Cl. ..................................... 318/689; 318/138; 74/5.6 A; 250/231 GY
[58] Field of Search .............. 318/689, 138; 74/5.6 A; 250/231 GY

[56] References Cited

U.S. PATENT DOCUMENTS

| | | | |
|---|---|---|---|
| 3,531,702 | 9/1970 | Hill | 318/138 |
| 3,603,161 | 9/1969 | Schwarz | 74/5.6 A |
| 3,915,019 | 10/1975 | Zoltan | 74/5.6 A |
| 4,275,343 | 6/1981 | Fulton et al. | 318/721 |
| 4,278,927 | 7/1981 | Grohe | 318/721 |
| 4,492,902 | 1/1985 | Ficken et al. | 318/254 |
| 4,610,172 | 9/1986 | Mickle et al. | 74/5.46 |

Primary Examiner—William M. Shoop, Jr.
Assistant Examiner—Saul M. Bergmann
Attorney, Agent, or Firm—Howard G. Massung

[57] ABSTRACT

A permanent magnet two degree of freedom gyroscope (10) utilizing a single rotor (12) having a trapezoidal shaped pattern formed thereon. The trapezoidal pattern consists of a reflective segment (11) and a non reflective segment (13). Two optical sensors (14, 18) fixed with respect to the stator, obtain angular displacement information about the two axes perpendicular to the spin axis, rotor pole location information, which is used for commutation, and, rotor speed information. The present invention deals with an apparatus and method for starting, running and torquing the two degree of freedom permanent magnet gyro motor (10) based on position and displacement information obtained from the two optical detectors (14, 18). The angular displacement information is obtained by sensing differences in the optical pattern as the rotor (12) spins and is displaced about cross-axes, perpendicular to the spin axis.

9 Claims, 5 Drawing Sheets

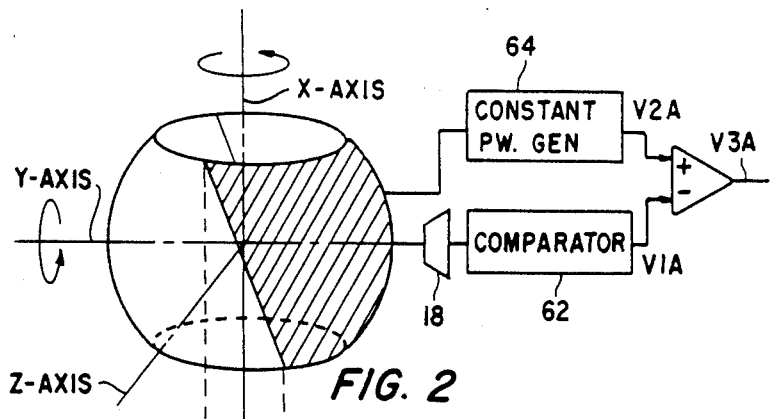
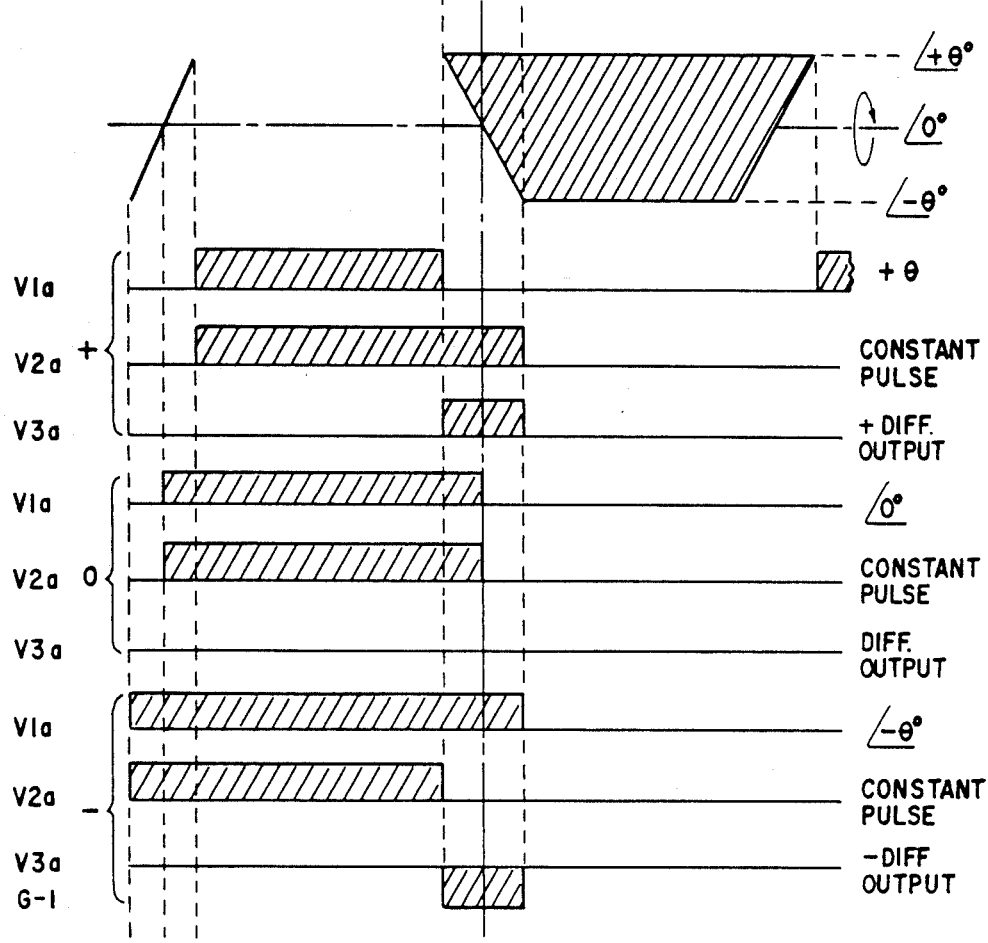
FIG. 2
FIG. 3

OPTICAL COMMUTATION AND TILT SENSING FOR A PERMANENT MAGNET GYRO

CROSS REFERENCE TO RELATED APPLICATIONS

This application is related to copending U.S. patent application No. 921,491 entitled Optical Commutation Permanent Magnet Motors which is assigned to the same assignee as the present application.

BACKGROUND OF THE INVENTION

1. Field of the Invention

The present invention relates to gyroscopes and more particularly to a permanent magnet, two degree of freedom, gyroscope which utilizes two optical sensors for obtaining angular displacement information about two axes and rotor pole location information for commutation.

2. Description of the Prior Art

Permanent magnet motors are utilized in inertial gyroscope sensing instruments where optimum efficiency, rate stability and low run up time are required. The drive motors include a two phase stator, permanent magnet rotor and suitable drive circuitry to start, run up and maintain synchronous speed. The rotor is supported by a hydrodynamic bearing wherein the spinning rotor supplies the pressurized fluid for the bearing. In the prior art, permanent magnet motor staring is implemented, without feedback, in an open loop manner. Without position feedback wheel starting characteristics are indeterminate and a no start condition could result under adverse environmental conditions. In the prior art driving and starting of the motor is achieved with a ramped increasing frequency two phase drive. At a suitable rotational speed, typically five to ten percent of synchronous speed, the windings of one phase are open and its back EMF provides a signal indicative of rotor position and speed. The other phase winding is energized, as a function of the back EMF signal, after the back EMF signal has been processed by suitable drive electronics.

During normal operation, after starting the permanent magnet motor is operated single phase. A permanent magnet two degree of freedom gyroscope, utilizing a single rotor, provides the same information as two single axis gyros. The single rotor, requiring only a single set of motor drive electronics, allows two axes of information to be contained in a compact package thus making it desirable in applications where size and weight are prime concerns. In addition to the sensors required for starting and running, prior art permanent magnet two degree of freedom gyros typically require two pickoff sensors to extract angular displacement information about the yaw and pitch gimbal attitudes. Each sensor contributes to the overall gyro size, cost and harnessing complexity and it is therefore desirable to use as few sensors as possible without sacrificing any information.

The present invention eliminates the start/restart electronics and continuously operates the permanent magnet gyro motor in a two-phase, closed loop, drive mode. The location of the rotor poles is determined by two optical sensors which are also utilized for sensing angular displacement about two axes. Both drive phases are available at all times to be driven for maximum torque.

SUMMARY OF THE INVENTION

A method and apparatus for operating a two degree of freedom permanent magnet motor gyroscope utilizing two optical sensors for obtaining angular displacement information about two axes and also for providing rotor pole location information for commutation. Two optical sensors detect the position of the permanent magnet rotor both at rest and when running and use the sensed information to sequentially energize stator windings to start, accelerate and maintain a desired speed. The two optical sensors also sense displacement of the rotor about two axes. Each optical pickoff is associated with one axis and senses the angular displacement of the rotor about that axis and each sensor also detects the instantaneous magnetic pole locations of the rotor. Each optical sensor output is generally a square wave whose pulse widths varies with the change in angular displacement of the rotor about the axis associated with the sensor and whose frequency is a function of rotor speed.

A formed trapezoidal pattern, consisting of reflective and nonreflective segments is formed on the rotor. The reflective and nonreflective segments correspond to the location of the magnetic north and south poles of the rotor. Each optical sensor associated with the phase winding is used to commutate the other phase for sequentially energizing the windings to drive the permanent magnet rotor. The optical detector signal is also converted to a signal which is proportional to the rotor speed. This speed signal is then compared to a speed command signal. The resulting error signal is conditioned and applied to the commutating switches, whose outputs, through appropriate drive electronics, are applied to the stator windings to drive the permanent magnet rotor at the commanded speed. The sensor outputs are square wave pulses whose frequency is a function of rotor speed and whose pulse width varies as a function of the angular displacement about the associated pickoff axis. The dynamic crossings of the square wave approximately correspond to the instantaneous rotor pole locations. The outputs of the sensor pickoff serve as inputs to both the motor drive electronics and the torquer servo control electronics. The servo control electronics extracts and processes the angular displacement information and provides the drive current to the torquers to obtain two axes control. The motor drive electronics uses the zero crossings of the square wave to provide the commutation needed to run-up and maintain synchronous operation. It is important that the angled sides of the trapezoidal pattern be properly sloped so that good commutation information is obtained when the rotor is displaced about its associated pickoff axis. That is, if the formed trapezoidal pattern too closely approaches a triangular pattern commutation could be adversely affected.

Thus just two optical sensors provide angular displacement information about two axes and rotor pole location information for commutation. This construction results in a continuous two phase closed loop drive which is not only a significant improvement over the prior art but is also simpler to implement.

BRIEF DESCRIPTION OF THE DRAWINGS

For a better understanding of the invention, reference may be had to the preferred embodiments exemplary thereof shown in the accompanying drawings in which:

FIG. 2 shows a permanent magnet rotor, the spin axis, and the formed rotor pattern according to the present invention;

FIG. 3 is a diagramatic view showing a flat view of the optical pattern formed on the rotor and various signals for different angular positions of the rotor spin axis.

DETAILED DESCRIPTION OF THE PREFERRED EMBODIMENTS

Figure 1:
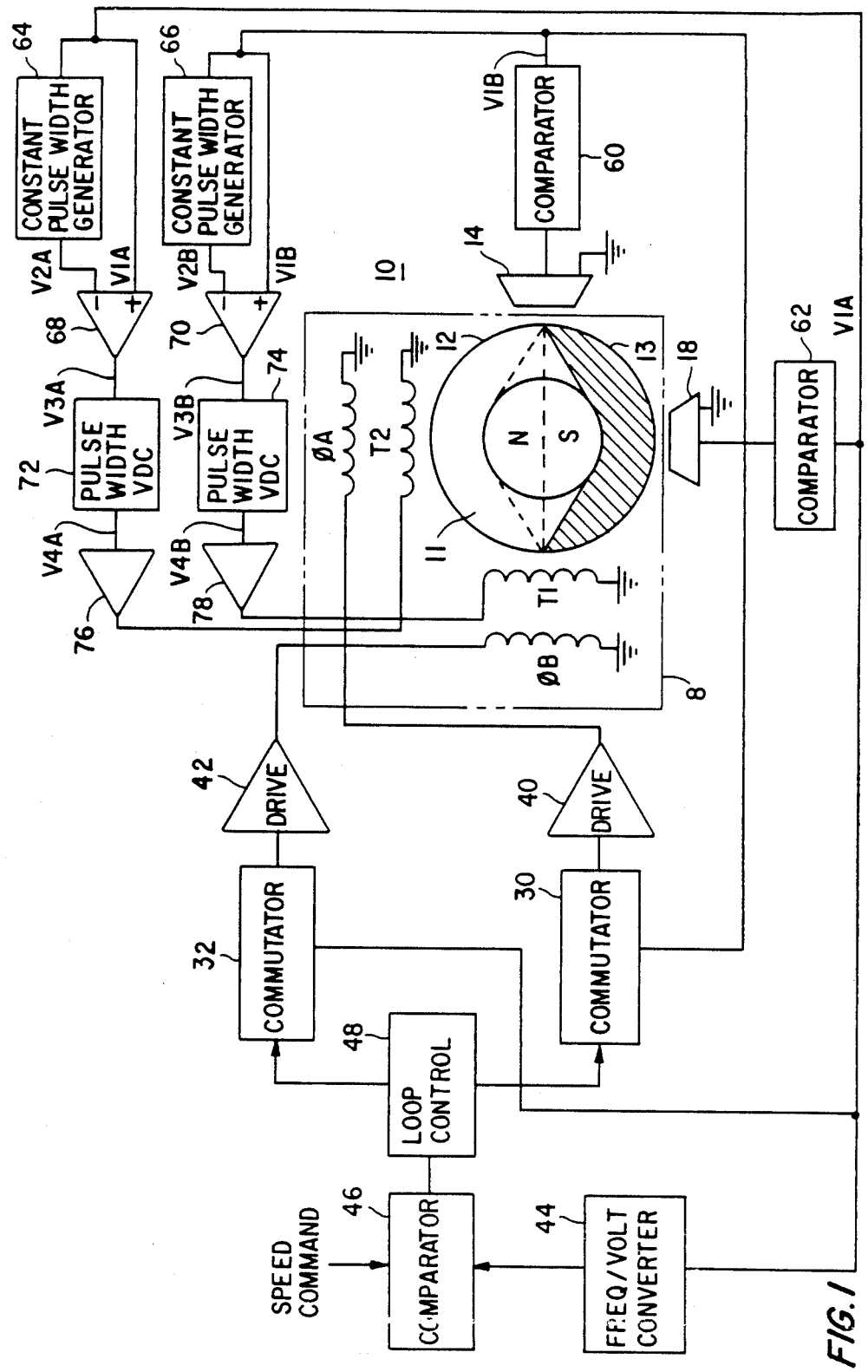
FIG. 1 is a partial schematic of a circuit for operating a permanent magnet two degree of freedom gyro according to the teachings of the present invention.
Figure 4:
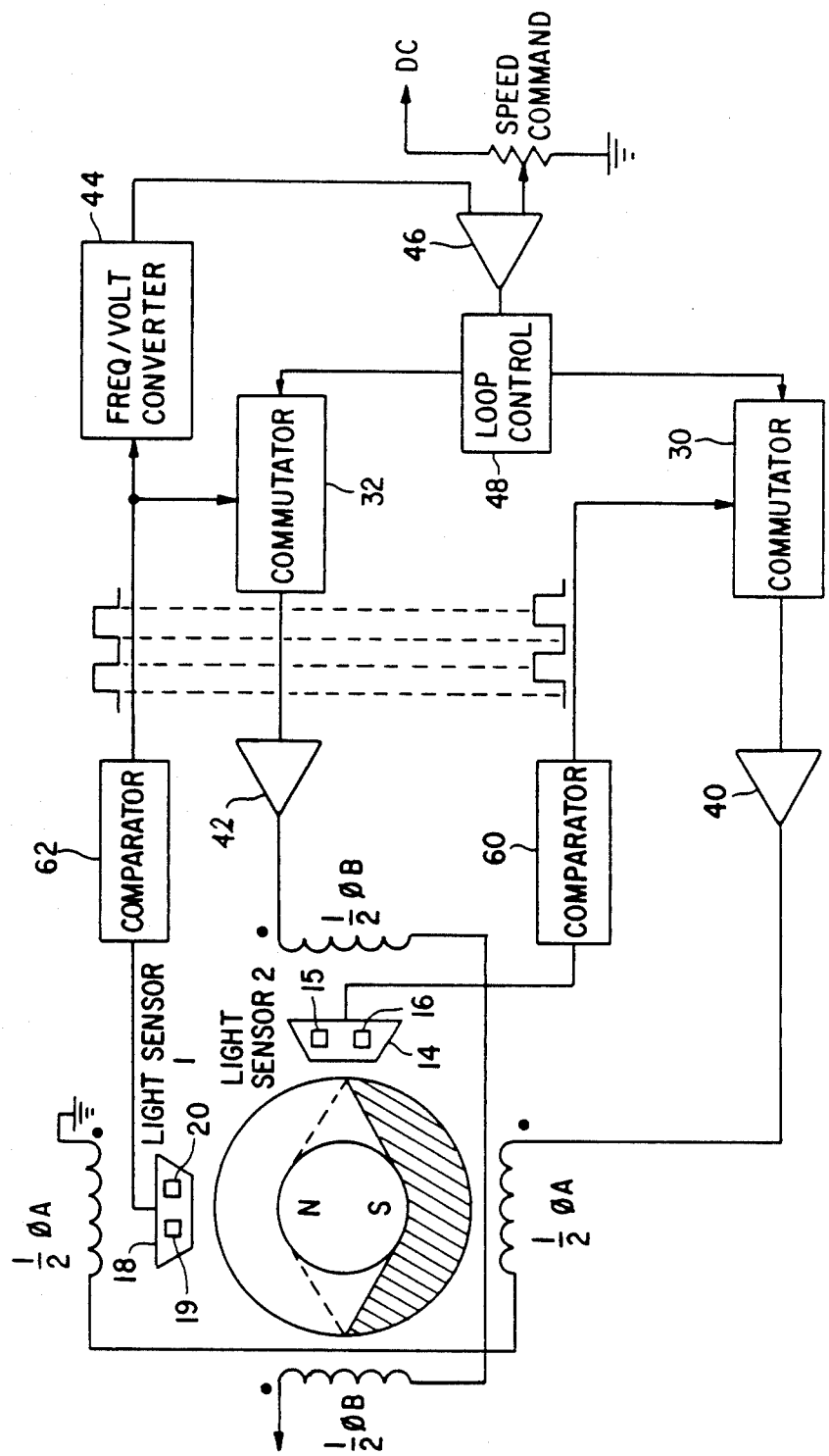
FIG. 4 is a schematic showing the motor drive circuitry associated with the two optical sensors.

Refering now to FIG. 1 of the drawings there is illustrated a two degree of freedom permanent magnet gyroscope and associated control circuitry 10 for an inertial sensing instrument. The drive motor includes a permanent magnet rotor 12 and a two phase stator having windings designated $\phi A$ and $\phi B$. A trapezoidal shaped optical pattern consisting of a reflective segment 11 and a nonreflective segment 13 is formed on gyro rotor 12. The formed optical pattern in a flattened representation is shown in FIG. 3. Two optical sensors 14 and 18 are positioned around the outer circumference of rotor 12 at a 90° separation. The permanent magnet two degree of freedom gyro consists of the spin motor which includes the permanent magnet rotor 12, the two phase stator windings $\phi A$, $\phi B$, torquer windings T1, T2, and two optical pickoffs 14, 18. The reflective segment 11 and nonreflective segment 13 correspond to the locations of the magnetic north and south poles of the rotor. As shown in FIG. 4, each optical sensors 14 and 18 includes a light source 15 and 19 and a light sensor 16 and 20 respectively.

Each light source 15 and 19 of the optical pickoff is directed at the rotor 12 striking either the reflective 11 or nonreflective 13 portion of the optical pattern. If light strikes a reflective segment 11 of the optical pattern then the associated light sensor 16, 20 will receive reflected light and be activated to produce a DC current. If the light from a source 15, 19 strikes a nonreflective portion 13 of rotor 12, than the associated light sensor 16, 20 will not be activated. The DC current generated by an activated light sensor 16, 20 is squared and buffered producing an output which is either plus 15 volts for a reflective surface or 0 volts for a nonreflective surface. When rotor 12 is spinning, the output square wave frequency is proportional to the rotor speed, while the zero crossing of the square wave approximately represents the instantaneous position of the rotor poles. The two phases of the permanent magnet motor are positioned 90° in space with respect to each other while the two pickoff sensors are also separated by 90°. Therefore, each buffered output of the pickoff sensor 14, 18 is associated with one phase of the stator and is used to provide the timing information for motor commutation. The outputs of optical sensors 14 and 18 which represent pole locations, serve as commands to commutator switches 30 and 32. The output of the commutator switches 30, 32 are fed to drivers 40 and 42 respectively. In a manner well known in the art drivers 40 and 42 drive their associated stator windings $\phi A$, $\phi B$. As the rotor 12 of the permanent magnet motor accelerates from rest, the buffered output from the optical sensor is a square wave whose frequency is proportional to wheel speed. The output of either sensor 14 or 18 can be used to generate the DC voltage using a frequency to DC voltage converter 44. As shown in FIG. 4, the resulting DC voltage from converter 44, which is proportional to rotor speed, is fed to a comparator 46 for comparison with a DC voltage input speed command signal. This results in a DC error signal at the output of comparator 46, which is fed to a loop control circuit 48 where it is integrated to provide velocity and position feedback information. The velocity and position feedback signal is amplitude and phase adjusted to compensate for the rotor wheel dynamics. The conditioned signal from loop control circuit 48 is then fed to both commutator switches 30 and 32 whose outputs feed the drivers 40 and 42. Operation of the permanent magnet motor is always in a two phase drive mode providing maximum torque capability.

With an optical pattern as shown in FIG. 3, when the rotor 12 rotates about its spin axis and is not displaced in relation to a spin reference axis which may also be referred to as the center axis of the stator, light will strike a nonreflective segment 50% of the time and a reflective segment 50% of the time. When an input rate is applied to the gyro causing an angular displacement or tilt of the rotor 12 in relation to a spin reference axis, light will be reflected either above or below the midpoint of the trapezoidal pattern. Light will no longer strike the reflective and nonreflective surfaces of rotor 12 for an equal amount of time. The sensor, 14 or 18 associated with the axis about which the rotor is displaced senses the reflective or nonreflective segments for different amounts of time resulting in a square wave which does not have a 50% duty cycle. The outputs from comparators 60 and 62 are differentially combined with the signals from a constant pulse width generators 64 and 66 in differential amplifiers 68 and 70. The resulting output from differential amplifier 68 or 70 is is fed to pulse width to DC voltage converter 72 or 74 to provide an error signal which through a torquer winding amplifier 76 or 78 provides a current output to either torquer winding T1 or T2 to drive rotor 12 to a null position.

Figure 6:
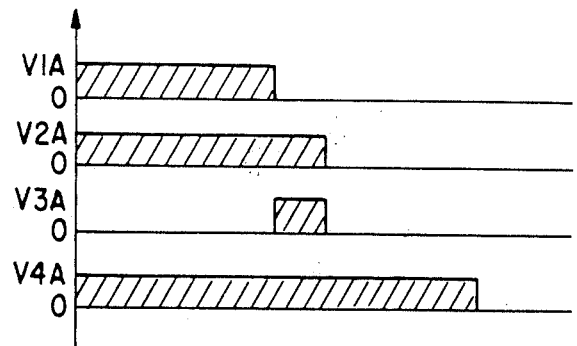
FIG. 6 represents waveforms at various points in the circuit of FIG. 5 for driving torquer winding T1.
Figure 7:
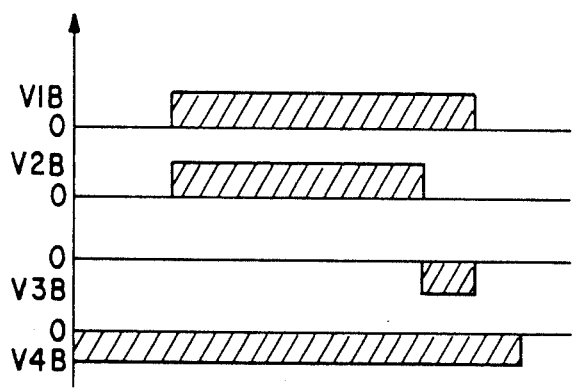
FIG. 7 represents waveforms at various points in the circuit of FIG. 5 for driving torquer winding T2.

Refering now to FIGS. 1, 2 and 3 the spin axis about which the rotor 12 is driven is designated as the X axis, light sensor 14 is positioned along the Z axis and senses displacement of the spinning rotor 12 about the Y axis. Light sensor 18 is positioned along the Y axis and senses displacement of the spinning rotor 12 about the Z axis. FIG. 3 shows various voltage outputs for a positive, zero, and a negative displacement of rotor 12 about the Z axis as sensed by a sensor 18. In FIG. 2, for a counterclockwise angular displacement of the rotor 12 about the Z axis pulse V1A is on for less than 180°, for no rotation of rotor 12 about the Z axis V1A is on for 180° and for clockwise displacement about the Z axis V1A is on for more than 180°. These differences in V1A caused by the trapezoidal pattern scanned by the sensor 18 as rotor 12 spins, indicate the displacement of rotor 12 about the Z axis. As shown in FIG. 6, the signal V1A is compared with a constant pulse width signal V2A, from constant pulse width generator 64, and the difference V3A is converted to a DC signal V4A which is amplified and utilized for energizing torquer winding T2, to torque rotor 12 to a null position. Sensor 14 detects angular displacement of rotor 12 about the Y axis and provides an output signal after comparator 60 of V1B. As shown in FIG. 7 signal V1B is processed, as described above for V1A, to energizing torquer winding T1 to torque rotor 12 to null.

Referring to the circuitry in FIG. 4, which is similar to the circuitry shown and described in copending U.S. patent application No. 921,491 and which is herein incorporated by reference, the outputs from sensors 14 and 18 provide commutation timing signals for two phase control of commutator switches 30 and 32. The input to commutators 30 and 32 is a DC error signal which is obtained by differentially combining a speed command signal with a feedback signal, obtained from sensor 18.

Figure 5:
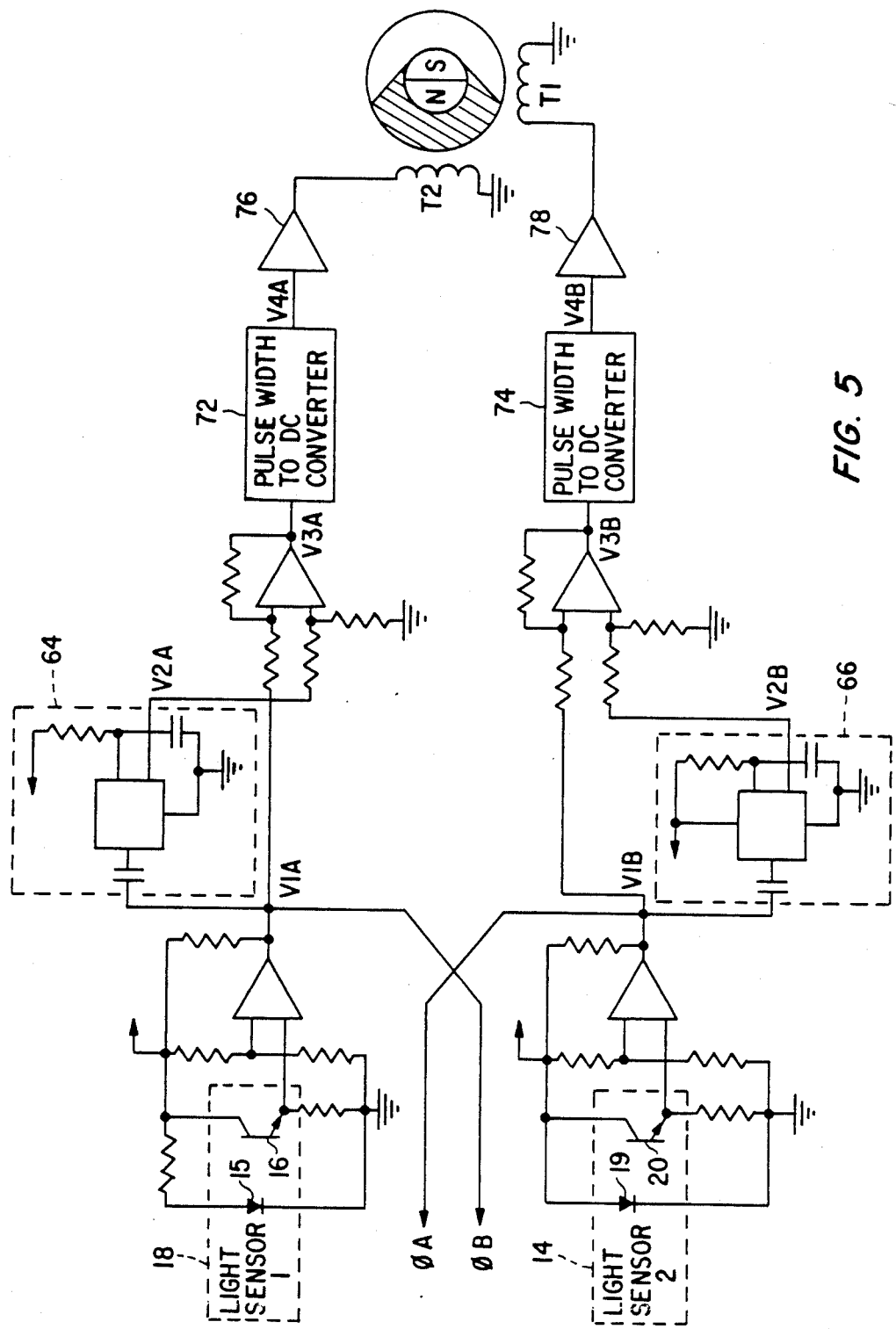
FIG. 5 shows the circuitry associated with the two optical sensors for sensing angular rotor spin axis displacement and for driving the torquer windings in a closed loop operation.

In FIG. 5 there is shown more detail of the portion of the circuit which senses and counteracts the angular displacement of rotor 12 about the Y or Z axis. The output of sensor 18 is a pulse V1A and output of light sensor 14 is a pulse V1B. When the rotor 12 is rotating at constant speed, the width of pulse V1A is a function of displacement about the Z axis and the width of pulse V1B is a function of displacement of rotor 12 about the Y axis. Pulses V1A and V1B activate constant pulse width generators 64 or 66, respectively. The output of the constant pulse width generator is a pulse V2A or V2B having a width equal to V1A or V1B when there is no displacement around the Y or Z axis. Pulses V2A and V2B are 50% duty cycle pulses. V2A is compared with V1A to provide a differential output V3A which through a pulsewidth to DC voltage converter 72 drives torquer winding T2. Likewise, constant pulsewidth V2B is compared with pulse V1B to provide a difference signal V3B which feeds a pulsewidth to DC voltage converter 74 which provides DC output V4B. This DC output V4B feeds amplifier 78 which drives torquer winding T1.

FIG. 6 shows waveform outputs for voltages V1A, V2A, V3A and V4A for positive displacement about the Z axis. FIG. 7 shows voltage outputs V1B, V2B, V3B and V4B for displacement of rotor 12 about the Y axis.

In the preferred embodiment the optical pattern formed on the gyro rotor 12 has a trapezoidal waveshape. The light source is directed at the midpoint of the trapezoidal waveshape so that as the rotor 12 spins at a constant rate about the X-axis and is not displaced about the Y and Z axes, light will strike a reflective segment for the same amount of time as it strikes a nonreflective segment, resulting in a 50% duty cycle square wave. When an input rate is applied to displace the gyro, causing an angular displacement or tilt of the rotor about either the Y axis or Z axis, the light will strike above or below the midpoint of the trapezoidal waveshape depending upon the polarity of the displacement. The light will no longer strike the reflective and nonreflective surfaces for an equal amount of time. The resulting buffered sensor outputs contain angular displacement information. The angular displacement information is then extracted and phase and amplitude adjusted to deliver the amount of current to the torquers to maintain a closed loop operation.

Extracting this displacement information requires sensing a small change in the duty cycle of the sensor generated square wave outputs. In order to improve resolution, a constant pulsewidth V2A or V2B is subtracted from the square wave. Each output V1A, V1B triggers a constant pulsewidth generator circuit and is also an input to a differential amplifier. The output of the pulsewidth generator circuits are combined in differential amplifiers with the sensor outputs to produce a difference signal. The difference signal contains the angular displacement information necessary to close the two cross-axes loops. The V3A and V3B outputs are then converted to DC levels V4A and V4B which are proportional to the width of V3A and V3B. The V3A output is shown in FIG. 6 for a positive input rate which results in a pulse whose width is smaller than the width of the constant pulse, resulting in a positive DC output V4A. The V3B output is shown for a negative input rate which results in a pulse whose width is larger than the width of the constant width pulse, resulting in a negative DC output V4B. These DC outputs are frequency compensated and amplified to drive the torquer windings T2 and T1.

We claim:

1. A permanent magnet motor gyro apparatus comprising:
   a permanent magnet rotor which is rotated about a spin axis;
   at least two stator windings, disposed for driving said permanent magnet rotor when energized;
   an optical pattern having a generally trapezoidal shape consisting of a reflective segment and a nonreflective segment formed on said permanent magnet rotor;
   optical detector means comprising a pair of optical detectors disposed with respect to said permanent magnet rotor for sensing said trapezoidal optical pattern;
   drive circuit means responsive to said optical detector means for driving said stator windings to start and drive said permanent magnet rotor; and,
   means for sensing the output of said optical detector means for determining tilt of said permanent magnet rotor in relation to a spin reference axis.

2. A gyro as claimed in claim 1 comprising:
   torquer winding means which when energized torques said permanent magnet rotor to a null position; and,
   drive means responsive to an output from said optical detector means for energizing said torquer winding means when said rotor is displaced in relation to a spin reference axis.

3. A method of driving and torquing a permanent magnet rotor of a gyroscope motor having stator windings and torquer windings comprising the steps of:
   (a) providing a generally trapezoidal optical pattern on the rotor;
   (b) detecting the optical pattern from angularly displaced locations on the stator;
   (c) driving the stator windings in response to the detected optical pattern to accelerate and drive the rotor at a desired speed; and
   (d) detecting different widths of the optical pattern as the rotor is displaced in relation to a spin reference axis to provide an error signal for energizing the torquer windings.

4. Gyroscope motor drive apparatus comprising:
   a permanent magnet motor having a pair of stator windings, a pair of torquer windings, and permanent magnet rotor;

an optical pattern, formed on said permanent magnet rotor having a generally reflective segment and a generally nonreflective segment with each segment having a circumferential width which is not constant;

a pair of optical detectors, fixed with respect to said permanent magnet rotor, disposed to sense the position of the rotor by sensing said formed optical pattern and also to sense displacement of the rotor axis with respect to the stator axis; and, a pair of commutator switches, one associated with each stator winding and operable sequentially in response to signals from said pair of optical detectors to start and drive said rotor.

5. Gyroscope motor drive apparatus as claimed in claim 4, comprising:

torquer drive means responsive to said pair of optical detectors for providing an output in response to displacement of the rotor axis with respect to the stator axis to drive the torquer windings to urge the rotor to a null position wherein the rotor axis and the stator axis are aligned.

6. A drive for a gyroscopic instrument having a motor with a permanent magnet rotor comprising:

a pattern consisting of a reflective segment and a less reflective segment, formed on the permanent magnet rotor, with each segment having a nonconstant circumferential width;

a stator having at least a pair of drive windings and a pair of torquer windings;

a pair of detectors disposed on the stator at approximately a 90° separation;

drive means connected to receive output signals from said pair of detectors for energizing the stator drive windings to start and continuously drive the rotor and for energizing said torquer windings when the spin axis of said rotor is displaced from the center axis of the stator to urge the rotor to a null position.

7. Apparatus as claimed in claim 6 comprising;

a speed command signal;

feedback means connected to at least one of said pair of detectors for providing a feedback speed signal;

comparator means for comparing the speed command signal and the feedback signal and for providing an output error signal which is utilized for energizing stator windings to drive the rotor at the commanded speed.

8. A permanent magnet motor gyro apparatus comprising:

a permanent magnet rotor which is rotated about a spin axis;

stator winding means which when energized drives said permanent magnet rotor;

torquer winding means which when energized torques said permanent magnet rotor;

an optical pattern consisting of a reflective segment and a nonreflective segment formed on said permanent magnet rotor so that good commutation information is obtained when said permanent magnet rotor is displaced in relation to a spin reference axis;

optical detector means disposed with respect to said permanent magnet rotor for sensing said optical pattern;

drive circuit means responsive to an output from said optical detector means for energizing said stator winding means to start and drive said permanent magnet rotor; and, drive circuit means responsive to an output from said optical detector means for energizing said torque winding means when said rotor is displaced in relation to the spin reference axis.

9. A gyro as claimed in claim 8, wherein said optical detector means comprises a pair of detectors positioned around the outer circumference of said permanent magnet rotor at approximately a 90° separation, with each detector being associated with one axis and each detector senses angular displacement of said permanent magnet rotor about that axis.

* * * * *